Jan. 12, 1937.  O. M. ANDERSON  2,067,470
STRAINER FOR PERCOLATORS
Filed Feb. 21, 1935

Inventor
Oscar M. Anderson

By W. Clay Lindsey.
Attorney

Patented Jan. 12, 1937

2,067,470

UNITED STATES PATENT OFFICE 2,067,470

STRAINER FOR PERCOLATORS

Oscar M. Anderson, New Britain, Conn., assignor to Landers, Frary & Clark, New Britain, Conn., a corporation of Connecticut Application February 21, 1935, Serial No. 7,516

3 Claims. (Cl. 210—162)

This invention relates generally to percolators of the type in which the steam created in the kettle forces the heated water up through a stem or spout into an upper receptacle in which the coffee material is supported on a strainer, and has particular reference to the construction of the strainer.

The aim of the invention is to provide an improved strainer having various features of novelty and advantage and which is characterized by its extreme simplicity in construction, the economy with which it may be manufactured, the ease and facility with which it may be positioned within and removed from the coffee receptacle, and which is very sanitary in that it is devoid of angles or crevices, and may be very easily and readily cleaned.

Other objects will be in part obvious, and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawing wherein I have shown, for illustrative purposes, one embodiment which the present invention may take, Fig. 1 is a fragmentary detail of a percolator in cross section illustrating my improved strainer in position;

Figure 1:
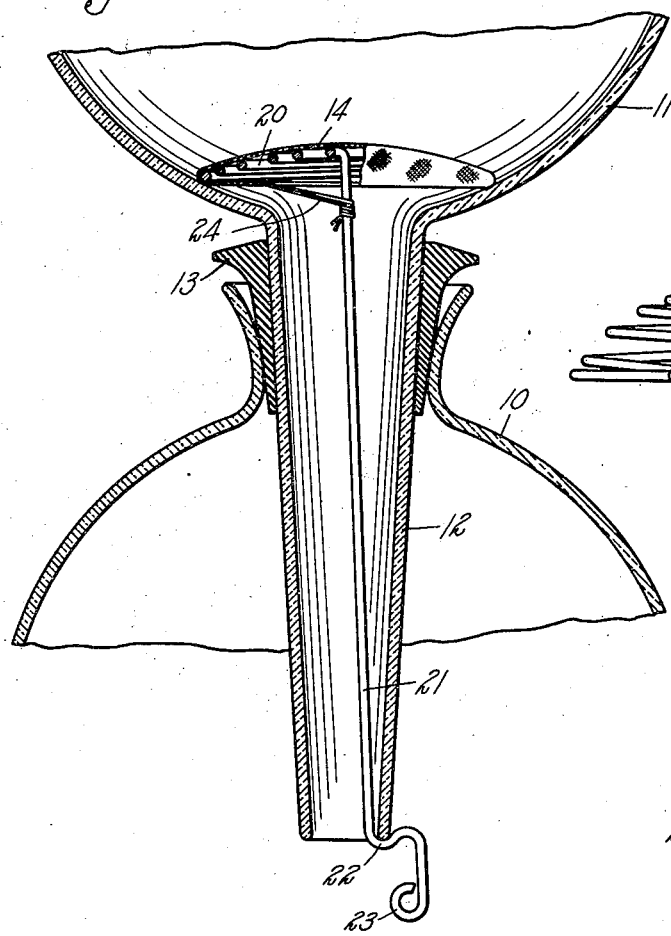
Figure 2:
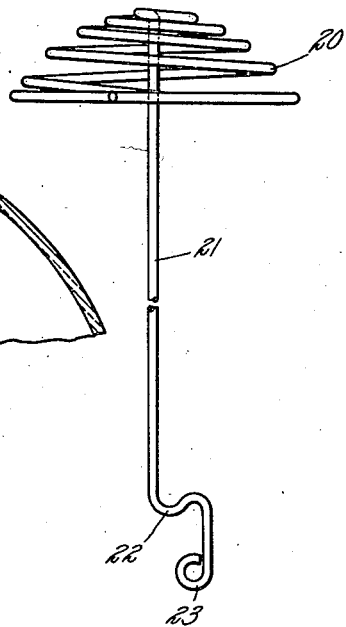
Fig. 2 is an enlarged view of the strainer holder.
Figure 3:
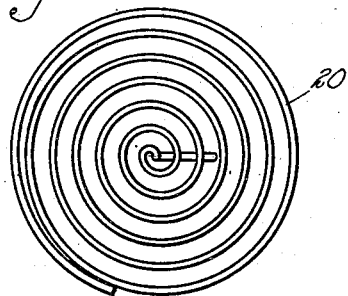
Fig. 3 is a top plan view of the strainer holder.

Referring to the drawing in detail, I have shown my improved arrangement incorporated in a percolator of well known type having a kettle or liquid receptacle 10 preferably formed of glass and adapted to be supported on the hot plate or over any suitable source of heat. Supported by the receptacle 10 is a coffee receptacle which is preferably in the form of a glass funnel having a bowl portion 11 and a stem or spout 12, the latter projecting down into the vessel 10. The stem 12 is seated within a rubber gasket or seal 13 which is supported within the neck of the vessel 10.

The strainer includes a filtering element 14 preferably in the form of a fabric cap and a holder for the element. In accordance with the present invention, the holder is formed from a single length of wire, and has a tapered or dome-shaped body portion 20 comprising a spiral coil with its convolutions spaced apart and of successively smaller diameter. Extending from the inner end of the coiled portion of the holder and projecting downwardly therethrough is a rod or stem 21 which, adjacent its lower end, is bent to form a hook 22. The extreme lower end of the rod projects below the hook and, if desired, may be formed with an eye 23.

To assemble the parts, the filtering cloth or cap 14 is placed about the body portion 20 of the holder, and the drawstring 24 is pulled tight so as to place the body portion under some compression whereby the fabric will be held more or less taut. The ends of the string are wrapped about the rod 21. The holder is then inserted into the coffee receptacle with the marginal edge of the body portion seating on the bottom of the bowl 11 about the throat of the stem 12, and the lower end of the rod 21 extending slightly below the lower end of the stem 12. The eye 23 is grasped and pulled down and then moved laterally so as to engage the hook 22 with the lower end of the stem 12, as shown in Fig. 1. When this is done, the body portion of the holder is placed under further compression with the result that the strainer is securely held in place, the body portion thereof being firmly seated in the bottom of the bowl 11. The strainer may be readily removed by merely unhooking the rod from the lower end of the stem 12 and then drawing the strainer through the upper end of the bowl 11.

It will be seen from the foregoing description, taken in connection with the accompanying drawing, that my improved strainer holder is extremely simple in construction, and since it may be formed from a single piece of wire by operations which may be economically carried out, the holder may be produced at relatively low cost. The coil for supporting the filtering element of fabric also serves as a spring for resiliently yet firmly holding the holder in place when the hook 22 is engaged with the lower end of the stem 12, thus eliminating the necessity of additional spring fingers, coiled springs, or the like. The holder may be very easily cleaned, there being no crevices or corners in which foreign matter may collect and all surfaces of the holder being readily accessible.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A strainer for a percolator comprising a resilient holder formed of a single piece of spring wire having an upwardly projecting portion composed of a plurality of spaced spiral convolutions of progressively smaller size, said convolutions rising in the general form of a dome which merges at its apex into a substantially concentric straight downward projection of said wire, a filtering fabric member supported by and encasing the domed portion, and a hooked portion at the lower end of said wire whereby the assembly may be removably secured in filtering position.

2. A strainer for percolators of the character described and comprising a filtering fabric having a drawstring, and a holder therefor and having a dome-shaped body portion about which said filtering fabric is positioned and a stem, said holder being formed of a length of wire one end of which is spirally coiled to form said body portion and the other end of which projects from the inner end of the coiled portion and through the same so as to form a stem, the lower end of said stem being provided with a hooked portion adapted to be engaged with the lower end of the stem of the coffee receptacle in which the strainer is positioned.

3. In a percolator, a funnel-shaped coffee receptacle having a bowl and a stem, a filtering fabric, and a holder for said fabric formed from a length of wire and having a spirally wound body portion seated within the bowl about the throat of said stem, and a rod portion extending from the inner end of said coiled portion and through said stem, said rod portion having a hook adjacent its lower end adapted to be engaged with the lower end of said stem, said rod portion being of such length that when the hooked portion is engaged with said stem said body portion is placed under compression whereby the holder is securely held in place.

OSCAR M. ANDERSON.